No. 793,465.

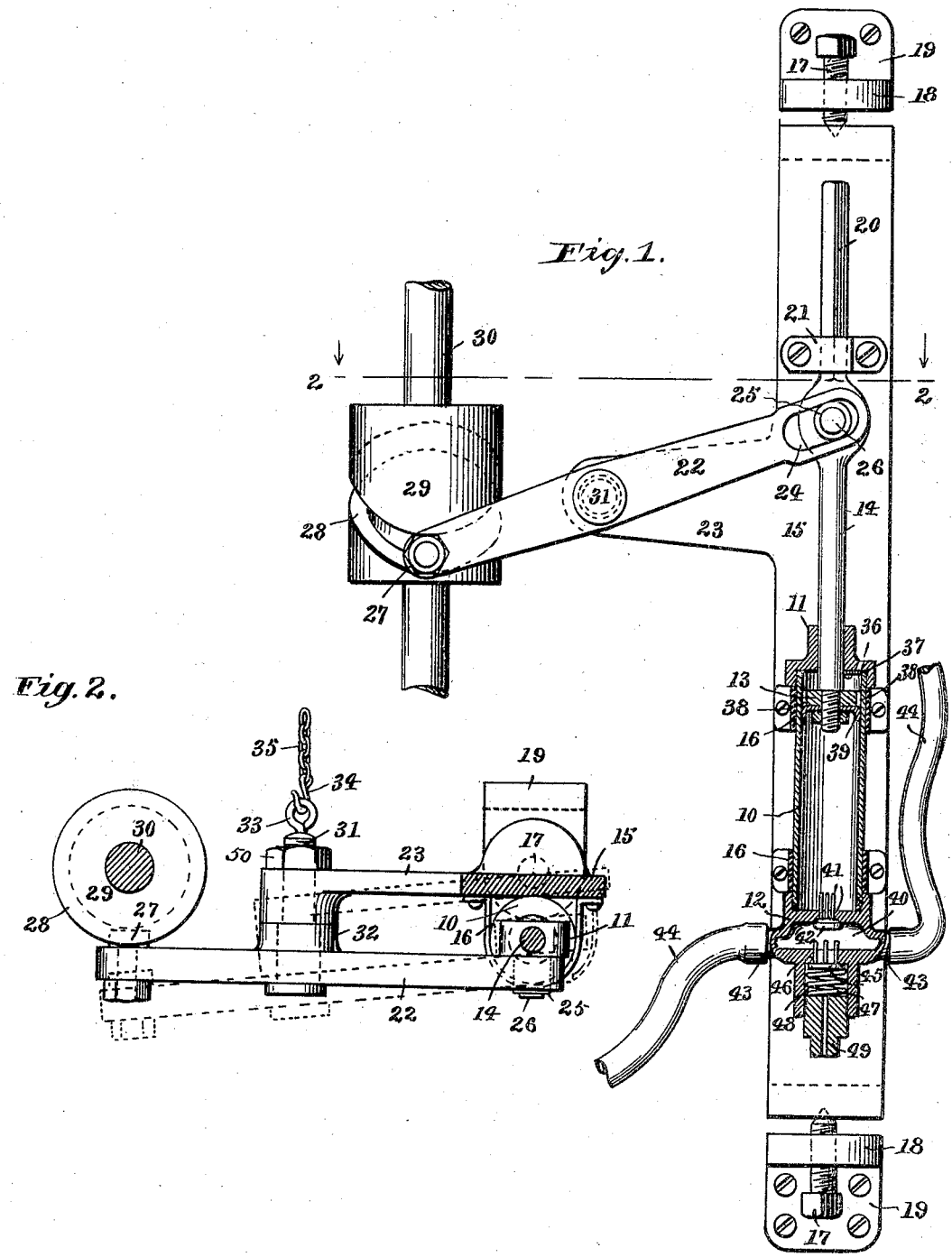

Patented June 27, 1905.

UNITED STATES PATENT OFFICE.

AXEL L. OLSON, OF ESSEX, CONNECTICUT.

AUTOMATIC PUMP FOR ROTATING TIRES.

SPECIFICATION forming part of Letters Patent No. 793,465, dated June 27, 1905.

Application filed February 20, 1905. Serial No. 246,479.

*To all whom it may concern:*

Be it known that I, AXEL L. OLSON, a citizen of the United States, residing at Essex, county of Middlesex, State of Connecticut, have invented a new and useful Automatic Pump for Rotating Tires, of which the following is a specification.

My invention has for its object to provide an automatic pump for use upon motor-cars and other vehicles using inflated tires, which will deliver air into a tire while the vehicle is in use and the wheel is rotating.

It is of course well understood that in using all kinds of vehicles having inflated tires punctures frequently occur which cause a tire to deflate more or less rapidly, and, furthermore, that the putting on of a new tire or the insertion of a new inner tube, or even the pumping up of a deflated tire with an ordinary foot or hand pump, are operations causing much inconvenience and loss of time. For this reason vehicles are not infrequently run a considerable distance with partially or wholly deflated tires, which is a source of grave danger to the vehicle and its occupants and usually ruins the tire.

My present invention enables me to provide an automatic pump that is operated by the engine of the vehicle and enables air to be forced into a tire without manual labor and when the vehicle is running as well as when stationary, so that unless the puncture is a serious one the tire may be kept inflated and the vehicle run as usual until repairs can be made, a safety-valve being provided in the pump which will relieve the tire of excess of pressure.

In order that the pump may be used when a wheel is rotating, a special form of connection is required intermediate the pump and the wheel. Any connection that will serve the purpose may be used. I preferably, however, use my novel pump conjointly with a novel connection for inflating rotating tires, which forms the subject of an application for Letters Patent Serial No. 246,480, filed of even date herewith.

In the accompanying drawings, forming a part of this specification, Figure 1 is an inverted plan view, partly in section, illustrating the construction of my novel pump, its connection with a vehicle, and mode of operation; and Fig. 2 is a section on the line 2 2 in Fig. 1 looking in the direction of the arrow.

10 denotes the cylinder of the pump, 11 and 12 the heads, 13 the piston, and 14 the piston-rod, which passes through head 11.

15 denotes an oscillatory carrying-plate to which the pump is secured in any suitable manner, as by means of straps 16, having ears through which screws pass and engage the plate. The carrying-plate is adapted to oscillate on cone-pointed screws 17, which pass through ears 18 on brackets 19 and engage the ends of the plate. Brackets 19 are secured by means of bolts or screws upon the under side of the vehicle, upon which the pump is used wherever may be most convenient.

The outer end of the piston-rod is made angular, as at 20, to prevent oscillation and slides in a guide 21 upon plate 15. The rod and piston are reciprocated by means of an operating-lever 22, fulcrumed on an arm 23, which extends from plate 15, one end of the lever being shown as provided with a slot 24, which receives a roller 25, mounted to rotate on a pin 26, extending from the piston-rod, and the other end of the lever as provided with a roller 27, which engages a cam-groove 28 in a wheel 29, carried by a driving-shaft 30, which may be the regular driving-shaft of the vehicle or any shaft to which the cam-wheel may be conveniently attached.

The fulcrum-pin upon which the lever oscillates is indicated by 31. The special details of construction are of course unimportant so far as the principle of the invention is concerned. In the drawings I have indicated the fulcrum-pin as passing through a hub 32 on the lever, which oscillates on the pin and the upper end of the pin as threaded to engage arm 23 and as locked in place by a nut 50. An eye 33 is provided at the upper end of the fulcrum-pin or wherever convenient on the arm, which is adapted to be engaged by a hook 34 on a depending chain 35, the other end of which (not shown) may be attached in any suitable manner to the under side of the vehicle-body. In order to disconnect the pump from the driving-shaft when it is not required for use, the operator simply loosens the chain and allows roller 27 to drop out of the driving-cam groove through oscillation of the carrying-plate, arm, and lever on the cone-pointed screws, as clearly indicated by dotted lines in Fig. 2, in which position the pump will of course be inoperative. When the parts are in the position shown in full lines in Fig. 2, through the engagement of roller 25 with the slot in the lever and of roller 27 with the driving-cam groove reciprocatory movement will be imparted to the piston-rod and piston and the pump will operate in the usual manner.

The special style of pump used is of course immaterial so far as the principle of the invention is concerned. In the present instance I have illustrated a form of pump which I have found thoroughly operative and effective for the purpose required. Air enters the pump-cylinder through an opening 36 in head 11 when the piston is moving forward, escape of air when the piston is moving backward being prevented by a flap-valve 37. During the backward movement of the piston air passes the piston through openings 38, the air being held during the forward movement of the piston by piston-valve 39. Head 12 is provided with a chamber 40, into which air passes from the cylinder through an opening 41, the back passage of air being prevented by a valve 42.

43 denotes nipples leading from chamber 40 for the attachment of flexible tubes 44, which lead to the tires. I have illustrated head 12 as provided with a plurality of nipples in order that two or more tires may be inflated simultaneously, if desired. In ordinary use in inflating a single tire all but one of the tubes will be removed and the nipples not in use capped in the usual manner.

45 denotes a safety-valve lying in an opening 46, leading from chamber 40. This valve is provided in order to relieve a tire of excess of pressure when air is being pumped into it while in use. This valve is retained in the closed position by a spring 47, lying in a chamber 48 and bearing against the valve and against a perforated plug 49, through which air escapes when the valve is open. Spring 47 is made of sufficient power to retain the safety-valve in the closed position until the pressure in a tire reaches the desired limit. When this limit is reached, the safety-valve will blow off, rendering it unnecessary to stop the pump.

In ordinary use of a motor-car or other vehicle the pump will, of course, be disconnected. Should it be required to inflate a tire before starting on a trip, the pump may be connected up in the manner described, and the tire or a plurality of tires may be inflated by running the engine, leaving the driving-clutch of the vehicle disconnected. When the tire or tires are inflated, the pump is disconnected by oscillating the carrying-plate and placing the roller on the lever out of engagement with the cam-groove. Should a puncture occur on the road, the pump is connected up and is also connected in any suitable manner with the punctured tire, after which the vehicle may be used in the ordinary manner, air being constantly forced into the tire to keep it inflated and excess of pressure in the tire being relieved by the safety-valve. This enables the operator to continue the trip without additional delay until the tire can be repaired, after which it may be inflated again by the pump, as already explained.

Having thus described my invention, I claim—

1. In a device of the character described the combination with a pump and an oscillatory plate by which it is carried and which has an arm extending therefrom, of an operating-lever pivoted on said arm and connected to the piston-rod of the pump and means for retaining the lever in operative connection with driving mechanism.

2. In a device of the character described the combination with a pump, an oscillatory plate by which it is carried, and means for attaching said plate to a vehicle-body, of an operating-lever fulcrumed on the plate and connected to the piston-rod of the pump.

3. In a device of the character described the combination with a pump, an oscillatory plate by which it is carried, and means for attaching said plate to a vehicle-body, of an operating-lever fulcrumed on the plate and connected to the piston-rod of the pump, and means for oscillating the plate to place the latter in engagement and out of engagement with driving connections.

4. In a device of the character described the combination with a pump and an operating-lever therefor, of an oscillating plate by which the pump is carried, an arm extending from said plate on which the lever is fulcrumed and means for retaining the lever in engagement with driving connections.

5. In a device of the character described the combination with a pump-cylinder and piston, a head into which air passes from the cylinder, a valve to prevent back passage of air and a nipple for the attachment of a tire connection, of an oscillatory plate by which the pump is carried and an operating-lever adapted to be moved into and out of engagement with driving connections.

6. In a device of the character described the combination with a pump and an oscillatory plate by which it is carried, of driving connections and means for retaining said driving connections in and out of operative position.

In testimony whereof I affix my signature in presence of two witnesses.

AXEL L. OLSON.

Witnesses:
  CHAS. B. TILEY,
  RICHARD B. TILEY.